United States Patent [19]

Kuroda et al.

[11] Patent Number: 4,525,552

[45] Date of Patent: Jun. 25, 1985

[54] PROCESS FOR PRODUCING POLYOLEFINS

[75] Inventors: Nobuyuki Kuroda, Yokohama; Toru Nakamura, Kawasaki; Yutaka Shikatani, Yokohama; Kazuo Matsuura, Tokyo; Mitsuji Miyoshi, Fujisawa, all of Japan

[73] Assignee: Nippon Oil Co., Ltd., Tokyo, Japan

[21] Appl. No.: 577,327

[22] Filed: Feb. 8, 1984

Related U.S. Application Data

[63] Continuation of Ser. No. 329,026, Dec. 9, 1981, abandoned.

[30] Foreign Application Priority Data

May 7, 1981 [JP] Japan ................... 56-68684

[51] Int. Cl.$^3$ .................... C08F 4/02; C08F 10/00
[52] U.S. Cl. .................... 526/116; 502/125; 526/125; 526/128; 526/348.6; 526/352; 526/901
[58] Field of Search ................... 526/125, 116

[56] References Cited

U.S. PATENT DOCUMENTS

| | | | |
|---|---|---|---|
| 3,991,260 | 11/1976 | Matsuura et al. | 526/125 |
| 4,202,953 | 5/1980 | Matsuura et al. | 526/125 |
| 4,209,602 | 6/1980 | Kuroda et al. | 526/125 |
| 4,315,999 | 2/1982 | Matsuura et al. | 526/125 |

FOREIGN PATENT DOCUMENTS

| | | | |
|---|---|---|---|
| 2600593 | 7/1976 | Fed. Rep. of Germany | 526/125 |
| 50-28479 | 9/1975 | Japan | 526/125 |
| 56-26902 | 3/1981 | Japan | 526/125 |
| 2040967 | 9/1980 | United Kingdom | 125/ |

Primary Examiner—Edward J. Smith
Attorney, Agent, or Firm—Robert E. Burns; Emmanuel J. Lobato; Bruce L. Adams

[57] ABSTRACT

A process for the homopolymerization or copolymerization of olefins is disclosed, which is carried out in the presence of a catalyst system comprising the combination of at least one organometallic compound with a transition metal compound supported on a solid carrier, said solid carrier being obtained by the reaction of (a) a magnesium halide, (b) a compound represented by the formula: $Al(OR)_nX_{3-n}$, where R is a hydrocarbon residual group having 1 to 24 carbon atoms, X is a hydrogen atom, and n is $0 < n \leq 3$, and (c) a compound represented by the formula: $Si(OR')_mX_{4-m}$, where R' is a hydrocarbon residual group having 1 to 20 carbon atoms, X is a halogen atom, and m is $0 \leq m \leq 4$. The resulting polymers are characterized by a large bulk density and a narrow range of molecular weight distribution.

11 Claims, No Drawings

PROCESS FOR PRODUCING POLYOLEFINS

This is a continuation of application Ser. No. 329,026, filed Dec. 9, 1981, now abandoned.

BACKGROUND OF THE INVENTION

1. Field of the Invention

This invention relates to a process for the production of polyolefins employing novel catalysts.

2. Prior Art

Catalysts for the production of polyolefins have been known which include a transition metal compound such as a titanium compound and a vanadium compound carried on a magnesium halide, and an organometallic compound as disclosed, for example, in Japanese Patent Publication No. 39-12105. Another similar catalyst is described in Belgian Pat. No. 742,112 and includes titanium tetrachloride carried on a magnesium halide anhydride which has been activated by a ball mill. Either of such prior art has still much to be desired in respect of the catalytic activity.

German Pat. No. 2137872 is directed to the copulverization of magnesium halide, titanium tetrachloride and alumina whereby the consumption of magnesium halide is minimized. This process however has not achieved any substantial increase in the per solid polymerization activity.

It is known that the bulk density of a given polymer is also an important factor having regard to the yields as well as to the slurry handling.

SUMMARY OF THE INVENTION

The present invention provides a process for the homopolymerization or copolymerization of olefins using an improved catalyst which will achieve higher polymerization activity and greater bulk density of the resulting polymer as compared to the prior art teachings. The invention is further directed to the preparation of such improved catalyst which permits using reduced monomer partial pressures with minimum catalyst residues in the resulting polymer, whereby the step of removing the catalyst residue in the polymer can be dispensed with and the polymer handling procedures simplified, contributing to an economical polyolefins production.

Another advantage of the process of the invention is that the bulk density of the polymer being greater, there is obtained greater yield of polymer per unit polymerization reactor.

A further advantage of the invention resides in that despite the increased bulk density, the resulting polymer contains a relatively small proportion of objectionably coarse particles and minute particles of less than 50 microns. This makes it feasible to carry out the polymerization reaction in a continuous fashion and also facilitates centrifugal separation of polymer particles as well as the transport or otherwise handling of the polymer.

A still further advantage of the invention is that a polyolefin such as for example polyethylene which may be obtained according to the inventive process has a large bulk density such that less hydrogen concentrations are required to obtain an intended melt index and hence the total polymerization pressures can be held to a minimum.

Another, yet important advantage of the invention is that the polymer has a very narrow range of molecular weight distribution such that low molecular weight components extracted by hexane may be minimized, making it possible to apply the polymer most suitably to films for wrapping the foods and also to eliminate fuming in the molding process.

Still another advantage of the invention is that the rate of diminision with time of ethylene for example being absorbed by the catalyst is considerably reduced so that a relatively prolonged polymerization reaction can be achieved with a relatively small amount of catalyst.

Briefly stated, the foregoing advantages of the invention accrue from the provision of an improved catalyst comprising a solid catalyst component and an organometal compound, said solid catalyst component being a titanium compound and/or a vanadium compound supported on a solid carrier and being obtained by reaction of: (a) a magnesium halide, (b) a compound represented by the formula: $Al(OR)_n X_{3-n}$ where R is a hydrocarbon residual group having 1–24 carbon atoms, preferably an alkyl, aryl, or aralkyl group of 1–12 carbon atoms, most preferably an alkyl group of 1–4 carbon atoms, X is a halogen atom and n is $0 < n \leq 3$, and (c) a compound represented by the formula: $Si(OR')_m X_{4-m}$ where R' is a hydrocarbon residual group having 1–20 carbon atoms, X is a halogen atom, and m is $0 \leq m \leq 4$, preferably $0 < m \leq 4$, and a titanium and/or vanadium compound being supported on said solid carrier, i.e., the reaction product of components (a), (b) and (c).

DESCRIPTION OF THE PREFERRED EMBODIMENTS

The magnesium halide which is substantially anhydrous in the practice of the invention includes magnesium fluoride, magnesium chloride, magnesium bromide, magnesium iodide and mixtures thereof. According to the present invention, magnesium chloride is most preferred.

The compound of the formula $Al(OR)_n X_{3-n}$ includes aluminum trimethoxide, aluminum triethoxide, diethoxymonochloroaluminum, monoethoxydichloroaluminum, monomethoxydiethoxyaluminum, aluminum tri-n-propoxide, aluminum triisopropoxide, diisopropoxymonochloroaluminum, monoisopropoxydichloroaluminum, monomethoxydiisopropoxyaluminum, aluminum tri-n-butoxide, aluminum tri-sec-butoxide and aluminum tri-t-butoxide, amongst which aluminum trimethoxide and aluminum triethoxide are most preferred.

The compound of the formula $Si(OR')_m X_{4-m}$ includes silicon tetrachloride, monomethoxytrichlorosilane, monoethoxytrichlorosilane, monoisopropoxytrichlorosilane, mono-n-butoxytrichlorosilane, monopentoxytrichlorosilane, monooctoxytrichlorosilane, monostearoxytrichlorosilane, monophenoxytrichlorosilane, mono-p-methylphenoxytrichlorosilane, dimethoxydichlorosilane, diethoxydichlorosilane, diisopropoxydichlorosilane, di-n-butoxydichlorosilane, dioctoxydichlorosilane, trimethoxymonochlorosilane, triethoxymonochlorosilane, triisopropoxymonochlorosilane, tri-n-butoxymonochlorosilane, tri-sec-butoxymonochlorosilane, tetraethoxysilane and tetraisopropoxysilane.

The titanium and/or vanadium compound includes halides, alkoxyhalides, alkoxides and halogen oxides of titanium and/or vanadium. Trivalent and tetravalent titanium compounds are preferred as the titanium compound used in accordance with the invention.

The tetravalent titanium compound may be represented by the formula $Ti(OR)_nX_{4-n}$ (where R is an alkyl, aryl or aralkyl group of 1–20 carbon atoms, X is a halogen atom, and n is $0 \leq n \leq 4$.), typical examples of which include titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium, and tetraphenoxytitanium.

Typical examples of such trivalent titanium compound are a titanium trihalide resulting from reducing titanium tetrahalide such as titanium tetrachloride with hydrogen, aluminum, titanium or an organometal compound of a metal of Groups I–III of the Periodic Table, and a trivalent titanium compound resulting from reducing a titanium alkoxyhalide of the formula $Ti(OR)_mX_{4-m}$ (where R is an alkyl, aryl or aralkyl group of 1–20 carbon atoms, X is a halogen atom, and m is $0 < m < 4$.) with an organometal compound of a metal of Groups I–III of the Periodic Table.

The vanadium compound includes a trivalent vanadium compound such as vanadium trichloride and vanadium triethoxide, a tetravalent vanadium compound such as vanadium tetrachloride, vanadium tetrabromede, vanadium tetraiodide, and tetraethoxyvanadium, and a pentavalent vanadium compound such as oxytrichlorovanadium, ethoxydichlorovanadyl, triethoxyvanadyl and tributoxyvanadyl. According to the invention, tetravalent titanium compounds are most preferred.

To obtain a more effective result according to the invention, both titanium and vanadium compounds may be used in combination, in which instance the mole ratio of vanadium/titanium is preferably in the range of 2/1–0.01/1.

The organometal compound contemplated by the present invention may be those of metals belonging to the Group I to IV metals in the Periodic Table which are known as one component of the Ziegler catalyst and preferably includes organoaluminum compounds and organozinc compounds. Examples of these organometal compounds are organoaluminum compounds represented by the general formula $R_3Al$, $R_2AlX$, $RAlX_2$, $R_2AlOR$, $RAl(OR)X$, and $R_3Al_2X_3$ (where R is an alkyl group or aryl group of 1 to 20 carbon atoms, which may be the same or different; and X is a halogen atom), and organozinc compounds represented by the general formula $R_2Zn$ (where R is an alkyl group of 1 to 20 carbon stoms, which may be either identical or different). Typical examples of these compounds include triethylaluminum, triisobutylaluminum, trihexylaluminum, trioctylaluminum, diethylaluminumchloride, ethylaluminumsesquichloride, diethylzinc and mixtures thereof. The organometal compounds may usually be used in amounts of from 0.1 to 1,000 mols with respect to the transition metal compound.

There is no restriction imposed upon the method of reacting the components (a) a magnesium halide, (b) a compound of the formula $Al(OR)_nX_{3-n}$, and (c) a compound of the formula $Si(OR')_mX_{4-m}$. The components (a), (b), and (c) may be copulverized and/or contacted with one another under heated conditions either in the presence or absence of inert solvents, but preferably in the presence of such solvents, at temperatures ranging between 20° and 400° C., preferably 50° and 300° C., normally for 5 minutes to 20 hours.

The order of reacting the components (a), (b) and (c) is optional. They may be reacted all simultaneously or two of them may be reacted first and then with the remaining one.

The reaction of the components (a), (b) and (c) may be effected, for example, by a method (1) wherein the components (a), (b) and (c) are reacted at a temperature of 20°–400° C. in the presence of an inert solvent, a method (2) wherein the components (a) and (b) are reacted at a temperature of 20°–400° C. in the presence of an inert solvent, and then this reaction product and the component (c) are reacted at a temperature of 20°–400° C. in the presence of an inert solvent, a method (3) wherein the reaction product of components (a) and (b) and the component (c) are reacted by co-pulverization, a method (4) wherein the components (a) and (c) are reacted at a temperature of 20°–400° C. in the presence of an inert solvent, and then this reaction product and the component (b) are reacted at a temperature of 20°–400° C. in the presence of an inert solvent, a method (5) wherein the reaction product of components (a) and (c) and component (b) are reacted by co-pulverization, a method (6) wherein the components (a) and (b) are reacted by co-pulverization, and then this reaction product and component (c) are reacted at a temperature 20°–400° C. in the presence of an inert solvent, and a method (7) wherein the components (a) and (c) are reacted by co-pulverization, and then this reaction product and the component (b) are reacted at a temperature of 20°–400° C. in the presence of an inert solvent.

Inert solvents if desired to be used may be such hydrocarbon compounds and/or their derivatives which do not deactivate Ziegler catalysts. Examples of these inert solvents are various saturated aliphatic hydrocarbons, aromatic hydrocarbons, alicyclic hydrocarbons, alcohols, ethers and esters. Typical examples of such compounds are propane, butane, pentane, hexane, heptane, octane, benzene, toluene, xylene, cyclohexane, ethanol, diethyl ether, tetrahydrofuran, ethyl acetate and ethyl benzoate.

Titanium and/or vanadium compounds may be supported on the solid carrier by contacting both in the presence or absence of solvents inert to the carrier under heated conditions. This may be done preferably in the absence of such solvents at 50°–300° C., preferably 100°–150° C., normally for about 5 minutes to 10 hours. This reaction should of course be effected in an inert atmosphere free of oxygen and moisture. Unreacted transition metal compounds may be removed for instance with use of solvents inert to Ziegler catalysts, which solvents may be evaporated in vacuum in the usual manner so as to obtain solid particles.

Alternatively, the solid carrier may be added with requisite amounts of titanium and/or vanadium compounds and then copulverized.

It has now been found that the mol ratio of magnesium halide to compound of the formula $Al(OR)_nX_{3-n}$ in terms of Mg/Al is in the range of 1/0.001–1/20, preferably 1/0.01–1/1, most preferably 1/0.05–1/0.5. Amounts of the aluminum compound departing from these ranges would result in reduced polymerization activity.

The compound of the formula Si(OR')$_m$X$_{4-m}$ should be used in amounts of usually 0.1–50 grams, preferably 0.5–10 grams per 100 grams of the magnesium halide.

The titanium and/or vanadium compound should be used in such an amount that the resulting solid catalyst component contains 0.5–20, or preferably 1–10 percent by weight of titanium and/or vanadium so as to obtain a well balanced activity per titanium and/or vanadium and per solid catalyst.

Apparatus for effecting copulverization may be a ball mill, vibration mill, rod mill, impact mill or the like. Temperature, time and other operating conditions may be determined by those skilled in the art depending upon the particular apparatus employed. The temperature usually ranges from 0° C. to 200° C., or preferably from 20° C. to 100° C., and the time from 0.5 to 30 hours.

The polymerization of olefins according to the invention is carried out in very much the same way as it is done in the presence of Ziegler catalysts where the reaction takes place in a slurried, solution or gas-phase condition in the presence or absence of an inert hydrocarbon atmosphere substantially free of oxygen and water. The gas-phase polymerization is particularly preferred. It is carried out at a temperature of 20° to 120° C., preferably 50° to 100° C. and at a pressure of atmospheric to 70 kg cm$^2$, preferably 2 to 60 kg cm$^2$. Molecular weights of the resulting polymer may be regulated to some extent by varying the polymerization temperature as well as the quantities of catalysts but can be more effectively regulated by the addition of hydrogen in the polymerization system. It is possible to effect the polymerization reaction in two or more multi-stages involving different hydrogen concentrations, temperatures and other polymerization conditions.

The process of the invention may be applied to all olefins polymerizable with use of Ziegler catalysts and more specifically to the homopolymerization of alpha-olefins of 2–12 carbon atoms such as ethylene, propylene, 1-butene, hexene-1, 4-methylpentene-1, and octene-1, and also to the copolymerization of ethylene and propylene, ethylene and 1-butene, ethylene and hexene-1, ethylene and 4-methylpentene-1, ethylene and octene-1, and propylene and 1-butene, as well as ethylene and two or more of c-olefins with satisfactory results.

With a view to improving the quality of polyolefins, the invention may be applied to copolymerization of dienes such as butadiene, 1,4-hexadiene, ethylidenenorbornene, and dicyclopentadiene.

The following examples are provided for a better understanding of the invention but are not intended to impose limitations on the invention.

INVENTIVE EXAMPLE 1

Preparation of Solid Catalyst Component

A three-necked flask equipped with a magnetic induction type agitator was charged with 100 ml of ethanol, 20 grams of anhydrous magnesium chloride, 12 grams of aluminum tri-sec-butoxide and 10 grams of tetraethoxysilane. Reaction was continued under reflux for 3 hours. Upon completion of reaction, 150 ml of n-hexane was added to cause precipitation, the supernatant was removed, and vacuum drying was effected at 200° C. thereby producing a white dry powder.

12 grams of this powder and 2.3 grams of titanium tetrachloride were taken into a stainless steel pot of 400 ml containing 25 stainless steel balls of a half-inch diameter and subjected to ball milling for 16 hours at room temperature in a nitrogen atmosphere. As a result, there was obtained a solid catalyst component containing 39 mg. of titanium per gram of solid powder.

Polymerization

A stainless steel autoclave was used for gas-phase polymerization. A loop was formed with a blower, a flow controller and a dry cyclone. Temperature of the autoclave was adjusted with a flow of warm water through its jacket. The autoclave adjusted in its temperature at 80° C. was charged with the solid catalyst component at a rate of 50 mg./hr. and triethylaluminum at a rate of 5 m mol/hr. Butene-1/ethylene was added at controlled molar ratio of 0.27 and hydrogen was also supplied at controlled rate of 15% of the total pressure. Polymerization was effected at a total pressure held at 10 kg/cm$^2$.G with the gases in the system circulated by the blower. The resulting ethylene copolymer had a bulk density of 0.40, a melt index of 0.9 and a density of 0.9203. Catalytic activity was as high as 526,000 grams of copolymer per gram titanium.

After 10 hours of continuous run, the autoclave was opened for inspection whereupon there was no polymer deposit either on its inner wall or the agitator. The copolymer showed F.R. value of 7.1 which represents the ratio of a sample having a melt index of 2.16 measured with a load of 2.16 kg. at 198° C. to a sample having a melt index of 10 measured with a load of 10 kg. according to ASTM-D1238-65T. Its molecular weight distribution was very narrow.

A film of the copolymer was extracted in boiling hexane over 10 hours to show a hexane extract as small as 1.1 wt. %.

COMPARATIVE EXAMPLE 1

The procedure of Inventive Example 1 was followed in preparing a solid catalyst component except that no tetraethoxysilane was added. There was 41 mg. of titanium per gram of solid catalyst component. An autoclave adjusted in its temperature at 80° C. was charged with the above solid catalyst component at a rate of 50 mg./hr. and triethylaluminum at a rate of 5 m mol/hr. Butene-1/ethylene was added at controlled molar ratio of 0.27 and hydrogen was also supplied at controlled rate of 15% of the total pressure. Polymerization was effected at a total pressure held at 10 kg/cm$^2$.G with the gases in the system circulated by a blower. The resulting ethylene copolymer had a bulk density of 0.28, a melt index of 1.1 and a density of 0.9195. Catalytic activity was represented by 287,000 grams of copolymer per gram titanium.

After 10 hours of continuous run, the autoclave was opened for inspection whereupon there was found some polymer deposit on its inner wall as well as on the agitator. The copolymer showed F.R. value of 8.2 and a molecular weight distribution wider than that of the copolymer obtained in Inventive Example 1. A film of the copolymer was extracted in boiling hexane over 10 hours to show a hexane extract of 4.1 wt. %.

INVENTIVE EXAMPLE 2

The ball mill pot of the type described in Inventive Example 1 was charged with 10 grams of anhydrous magnesium chloride and 4.3 grams of aluminum triethoxide. The admixture was subjected to ball milling for 16 hours in a nitrogen atomsphere thereby obtaining a white pulverized product. 20 grams of this product, 150 ml of n-heptane and 15 grams of triethoxymonochlorosilane were taken into a 300 cc. three-necked flask equipped with an agitator. Reaction was continued under reflux for 5 hours, whereafter the reaction system was disposed still at room temperature and the supernatant liquid was removed. Vacuum drying was effected at 200° C. thereby producing a white dry powder. 10 grams of this powder and 2.3 grams of titanium tetrachloride were taken into the ball mill pot and subjected to ball milling for 16 hours in a nitrogen atmosphere. There was 40 mg. of titanium per gram of solid catalyst component. The autoclave adjusted in its temperature at 80° C. was charged with the solid catalyst component at a rate of 50 mg./hr. and triethylaluminum at a rate of 5 m mol/hr. Butene-1/ethylene was added at controlled molar ratio of 0.27 and hydrogen was also supplied at controlled rate of 15% of the total pressure. Polymerization was effected at a total pressure held at 10 kg/cm$^2$.G with the gases in the system circulated by the blower. The resulting ethylene copolymer had a bulk density of 0.38, a melt index of 1.0 and a density of 0.9210. Catalytic activity was as high as 658,000 grams of copolymer per gram titanium.

After 10 hours of continuous run, the autoclave was opened for inspection whereupon there was no polymer deposit either on its inner wall or the agitator. The copolymer showed F.R. value of 7.2 and a very narrow molecular weight distribution.

A film of the copolymer was extracted in boiling hexane over 10 hours to show a hexane extract as small as 1.4 wt. %.

INVENTIVE EXAMPLE 3

A three-necked flask equipped with a magnetic induction type agitator was charged with 150 ml of n-heptane, 30 grams of aluminum triethoxide and 10 grams of diethoxydichlorosilane. Reaction was continued under reflux for 3 hours. Upon completion of reaction, the supernatant was removed, and vacuum drying was effected at 50° C. thereby producing a whitish grey dry powder. 5.2 grams of this powder, 2.8 grams of titanium tetrachloride and 10 grams of anhydrous magnesium chloride were taken into a stainless steel pot of the type described in Inventive Example 1 and subjected to ball milling for 16 hours at room temperature in a nitrogen atmosphere. As a result, there was obtained a solid catalyst component containing 39 mg. of titanium per gram of solid powder.

The autoclave adjusted in its temperature at 80° C. was charged with the solid catalyst component at a rate of 50 mg./hr. and triethylaluminum at a rate of 5 m mol/hr. Butene-1/ethylene was added at controlled molar ratio of 0.27 and hydrogen was also supplied at controlled rate of 15% of the total pressure. Polymerization was effected at a total pressure held at 10 kg/cm$^2$.G with the gases in the system circulated by the blower. The resulting ethylene copolymer had a bulk density of 0.37, a melt index of 1.3 and a density of 0.9221. Catalytic activity was as high as 468,000 grams of copolymer per gram titanium.

After 10 hours of continuous run, the autoclave was opened for inspection whereupon there was no polymer deposit either on its inner wall or the agitator. The copolymer showed F.R. value of 7.1 and a very narrow molecular weight distribution.

A film of the copolymer was extracted in boiling hexane over 10 hours to show a hexane extract as small as 1.0 wt. %.

INVENTIVE EXAMPLE 4

The ball mill pot described in Inventive Example 1 was charged with 10 grams of anhydrous magnesium chloride and 3.5 grams of tetraethoxysilane, and this admixture was subjected to ball milling at room temperature in a nitrogen atmosphere for 16 hours, thereby obtaining a whitish grey particulate solid (A).

A three-necked flask of 300 cc. equipped with a magnetic induction type agitator was charged with 100 ml of hexane, 12.5 grams of the above solid (A) and 4.5 grams of aluminum tri-sec-butoxide. Reaction was continued under reflux for 5 hours. Upon completion of reaction, the supernatant was removed, and vacuum drying was effected at 200° C. thereby producing a particulate solid (B).

The solid (B) was reacted with 60 ml of diisopropoxydichlorotitanium at 130° C. for 1 hour. Upon completion of the reaction, excess of this titanium was removed and the reaction product was repeatedly washed with n-hexane thereby obtaining a whitish grey solid catalyst component, one gram of which contained 18 mg. of titanium.

The autoclave adjusted in its temperature at 80° C. was charged with the solid catalyst component at a rate of 50 mg./hr. and triethylaluminum at a rate of 5 m mol/hr. Butene-1/ethylene was added at controlled molar ratio of 0.27 and hydrogen was also supplied at controlled rate of 15% of the total pressure. Polymerization was effected at a total pressure held at 10 kg./cm$^2$.G with the gases in the system circulated by the blower. The resulting ethylene copolymer had a bulk density of 0.43, a melt index of 0.9 and a density of 0.9211. Catalytic activity was as high as 715,000 grams of copolymer per gram titanium.

After 10 hours of continuous run, the autoclave was opened for inspection whereupon there was no polymer deposit either on its inner wall or the agitator. The copolymer showed F.R. value of 6.9 and a very narrow molecular weight distribution.

A film of the copolymer was extracted in boiling hexane over 10 hours to show a hexane extract as small as 0.9 wt. %.

INVENTIVE EXAMPLE 5

A stainless steel autoclave of 2-liter capacity with an induction agitator was purged with nitrogen and then charged with 1,000 milliliters of hexane. 1 milli-mol of triethylaluminum and 10 milligrams of the solid catalyst component obtained in Inventive Example 1 were added. While the batch was being agitated, the temperature was elevated to 90° C. Under the vapor pressure of hexane, the reaction system showed a pressure of 2 kg/cm$^2$.G. The system was charged with hydrogen to a total pressure of 4.8 kg/cm$^2$.G, and subsequently ethylene was charged to a total pressure of 10 kg/cm$^2$.G, whereupon the polymerization was initiated. The polymerization was continued for 1 hour with continuous charge of ethylene to maintain a total pressure of 10 kg/cm$^2$.G. After termination of the polymerization, the polymeric slurry was decanted into a beaker, and hexane was removed in vacuum, whereby there was obtained 223 grams white polyethylene having a melt index of 1.4, a bulk density of 0.37 and a density of 0.9631. Catalytic activity was represented by 109,960 grams of polyethylene per gram titanium per hour per ethylene pressure, or 4,290 grams of polyethylene per gram solid per hour per ethylene pressure.

The resulting polyethylene showed F.R. value of 8.4 and a molecular weight distribution much narrower than that of the product obtained in Comparative Example 2 below. Hexane extract was 0.15 wt. %.

COMPARATIVE EXAMPLE 2

The procedure of Inventive Example 5 was followed in polymerizing 10 mg. of solid catalyst component of Comparative Example 1 over 1 hour. 198 grams of white polyethylene was obtained, which showed a melt index of 1.5, a density of 0.9635 and a bulk density of 0.32. Catalytic activity was represented by 92,870 grams polyethylene per titanium per hr. per ethylene pressure or 3,800 grams polyethylene per gram solid per hr. per ethylene pressure.

The resulting polyethylene showed F.R. value of 9.5 and hexane extract of 1.0 wt. %.

INVENTIVE EXAMPLE 6

A three-necked flask of 300 cc. equipped with a magnetic induction type agitator was charged with 100 ml of n-heptane, 20 grams of anhydrous magnesium chloride, 15 grams of aluminum tri-n-hexoxide and 10 grams of tetraethoxysilane. Reaction was continued under reflux for 3 hours. Upon completion of reaction, 150 ml of n-hexane was added, the supernatant was removed, and vacuum drying was effected at 200° C. thereby producing a white dry powder. 12 grams of this powder and 2.5 grams of titanium tetrachloride were taken into a stainless steel pot of 400 ml containing 25 stainless steel balls of a half-inch diameter and subjected to ball milling for 16 hours at room temperature in a nitrogen atmosphere. As a result, there was obtained a solid catalyst component containing 37 mg. of titanium per gram of solid powder.

Continuous gas-phase polymerization of the above solid catalyst component was effected in the same manner as in Inventive Example 1 except that the catalyst component was supplied at a rate of 50 mg./hr. The resulting ethylene copolymer showed a bulk density of 0.38, a density of 0.9201 and a melt index of 1.1, and a catalytic activity of 495,000 grams copolymer per gram titanium. The copolymer further showed F.R. value of 7.3 and a hexane extract of 1.2 wt. %.

What is claimed is:

1. A process for the production of polyolefins which comprises homopolymerizing or copolymerizing α-olefins of 2 to 8 carbon atoms in the presence of a catalyst comprising a solid carrier carrying 1 to 10 percent by weight of a tetravalent titanium compound and/or a vanadium compound and an organometallic compound, the polymerization being effected at a temperature of 50° to 100° C. and at a pressure of 2 to 60 kg./cm.$^2$, said solid carrier resulting from the reaction of:
   (a) a magnesium halide;
   (b) a compound represented by the formula $Al(OR)_nX_{3-n}$ where R is a hydrocarbon residual group having 1 to 24 carbon atoms, X is a halogen atom and n is $1 \leq n \leq 3$, and wherein the mol ratio of said magnesium halide (a) to said compound (b) in terms of Mg/Al is in the range of 1/0.05 to 1/0.5; and
   (c) a compound represented by the formula $Si(OR')_mX_{4-m}$ where R' is a hydrocarbon residual group having 1 to 20 carbon atoms, X is a halogen atom and m is $1 \leq m \leq 4$, and wherein said compound (c) is used in an amount of 0.1 to 50 grams per 100 grams of said magnesium halide (a),
   at least two components of said solid carrier selected from said magnesium halide (a), said compound (b) and said compound (c) being reacted in the presence of an inert solvent at a temperature of 20° to 400° C.

2. A process for the production of polyolefins according to claim 1 wherein the polymerization of α-olefins is effected in gas-phase.

3. The process for production of polyolefins according to claim 1 wherein in said compound (b) of the formula $Al(OR)_nX_{3-n}$ R is an alkyl, aryl or aralkyl group of 1 to 12 carbon atoms.

4. The process for the production of polyolefins according to claim 1 wherein said magnesium halide is magnesium chloride.

5. The process for the production of polyolefins according to claim 1 wherein said solid carrier carries a tetravalent titanium compound.

6. The process for the production of polyolefins according to claim 1 wherein said solid carrier a carries titanium and a vanadium compound in the mole ratio of vanadium/titanium in the range of 2/1 to 0.01/1.

7. The process for the production of polyolefins according to claim 1 wherein said α-olefin is selected from the group consisting of ethylene, propylene, butene-1, 4-methylpentene-1 and octene-1.

8. The process for the production of polyolefins according to claim 1 wherein said magnesium halide is magnesium chloride and in said compound (b) of the formula $Al(OR)_nX_{3-n}$, R is an alkyl, aryl or aralkyl group of 1 to 12 carbon atoms.

9. The process for the production of polyolefins according to claim 1 wherein said magnesium halide is magnesium chloride and said compound (b) is a trialkoxyaluminum wherein the alkoxy groups contain 1 to 12 carbon atoms.

10. The process for the production of polyolefins according to claim 1 wherein the reaction of said magnesium halide (a), said compound (b) and said compound (c) is carried out in the presence of an invert solvent at a temperature of 50° to 300° C.

11. A process for the production of polyolefins which comprises homopolymerizing or copolymerizing α-olefins selected from the group consisting of ethylene, propylene, butene-1, hexene-1,4-methylpentene-1, and octene-1 in the presence of a catalyst comprising a solid carrier carrying 1 to 10 percent by weight of a tetravalent titanium compound and/or a vanadium compound and an organometallic compound, the polymerization being effected at a temperature of 50° to 100° C. and at a pressure of 2 to 60 kg./cm.$^2$, said solid carrier resulting from the reaction of:
   (a) a magnesium halide;
   (b) an aluminum alkoxide selected from a member of the group consisting of aluminum trimethoxide, aluminum triethoxide, diethoxymonochloroaluminum, monoethoxydichloroaluminum, monomethoxydiethoxyaluminum, aluminum tri-n-propoxide, aluminum triisopropoxide, diisopropoxymonochloroaluminum, monosiopropoxydichloroaluminum, monomethoxydiisopropoxyaluminum, aluminum tri-n-butoxide, aluminum tri-sec-butoxide and aluminum tri-t-butoxide, wherein the mol ratio of said magnesium halide (a)

to said compound (b) in terms of Mg/Al is in the range of 1/0.05 to 1/0.5; and (c) an alkoxysilane selected from a member of the group consisting of monomethoxytrichlorosilane, monoethoxytrichlorosilane, monoisopropoxytrichlorosilane, mono-n-butoxytrichlorosilane, monopentoxytrichlorosilane, monooctoxytrichlorosilane, monostearoxytrichlorosilane, monophenoxytrichlorosilane, mono-p-methylphenoxytrichlorosilane, dimethoxydichlorosilane, diethoxydichlorosilane, diisopropoxydichlorosilane, di-n-butoxydichlorosilane, dioctoxydichlorosilane, trimethoxymonochlorosilane, triethoxymonochlorosilane, triisopropoxymonochlorosilane, tri-n-butoxymonochlorosilane, tri-sec-butoxymonochlorosilane, tetraethoxysilane and tetraisopropoxysilane, wherein said compound (c) is used in an amount of 0.1 to 50 grams per 100 grams of said magnesium halide (a), at least two components of said solid carrier selected from said magnesium halide (a), said compound (b) and said compound (c) being reacted in the presence of an inert solvent at a temperature of 20° to 400° C.

* * * * *